H. J. GILBERT.
PULLEY.
APPLICATION FILED JUNE 8, 1903.
1,010,614.
Patented Dec. 5, 1911.
2 SHEETS—SHEET 1.
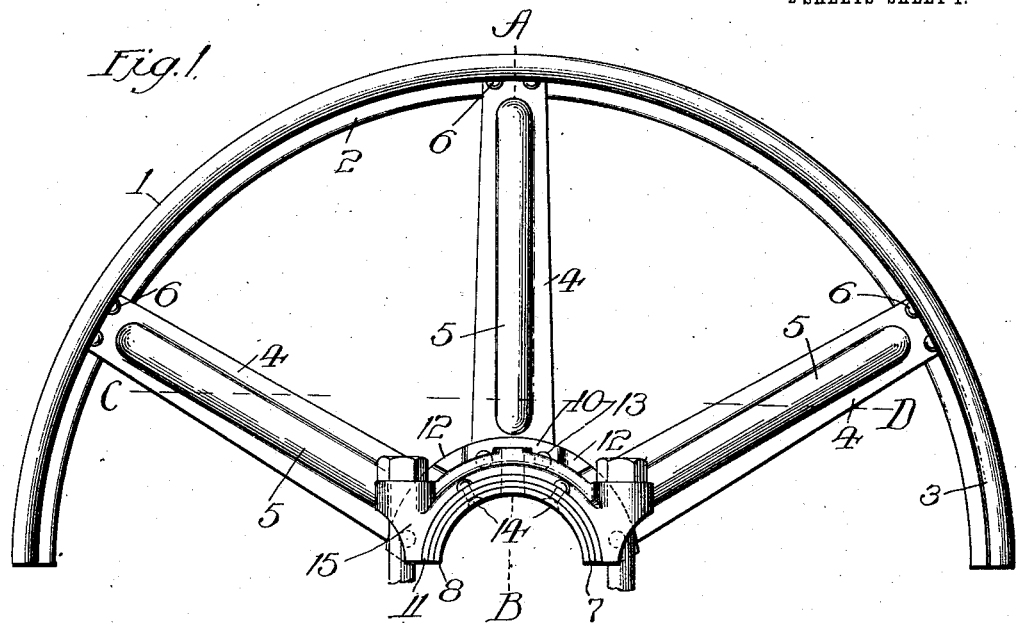
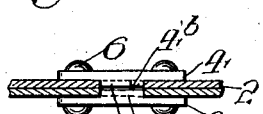
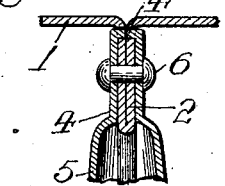
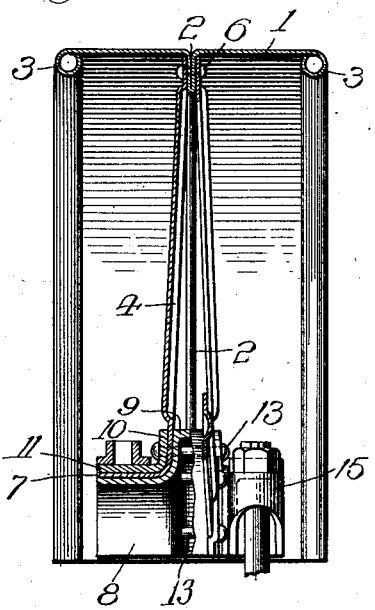
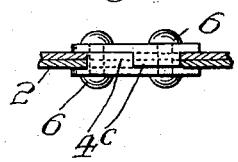
Witnesses:
Harold G. Barrett
Edward R. Barrett
Inventor
Henry J. Gilbert
By Rector & Kibben
his Atty's.

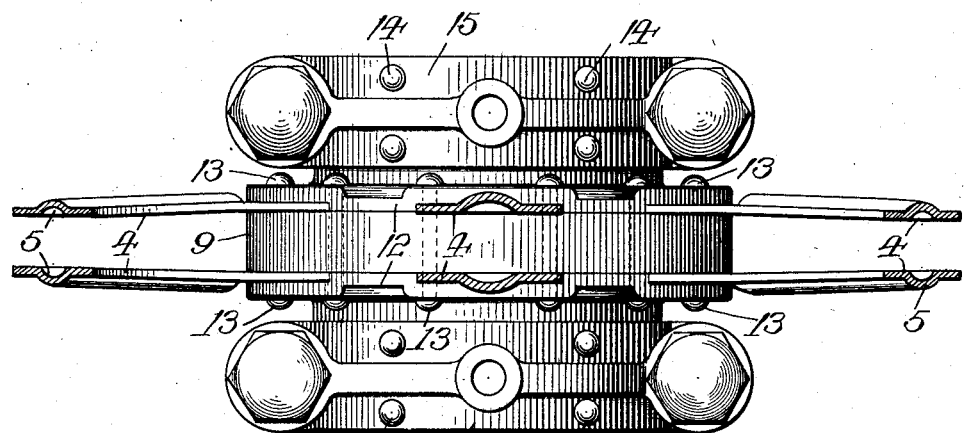
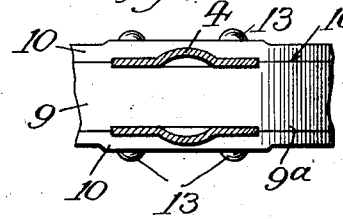
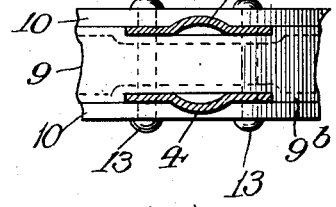
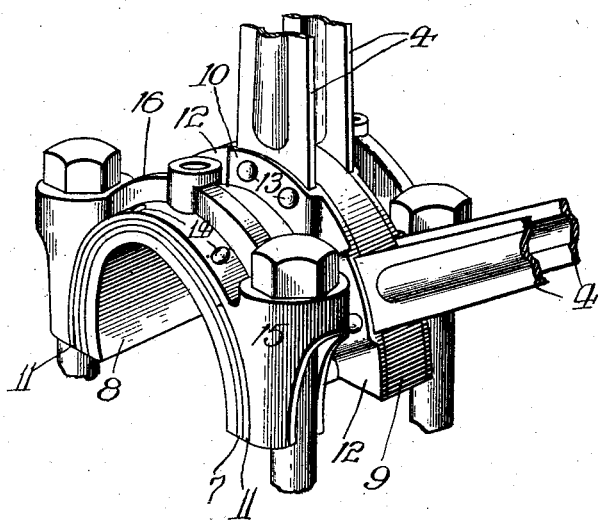

UNITED STATES PATENT OFFICE.

HENRY J. GILBERT, OF SAGINAW, MICHIGAN.

PULLEY.

1,010,614. Specification of Letters Patent. Patented Dec. 5, 1911.

Application filed June 8, 1903. Serial No. 160,522.

*To all whom it may concern:*

Be it known that I, HENRY J. GILBERT, residing at Saginaw, Saginaw county, Michigan, have invented certain new and useful Improvements in Pulleys, of which the following is a specification.

My invention relates to pulleys or wheels, and the object thereof is to provide an efficient pulley of metal, more particularly sheet metal, suitably shaped and arranged.

My invention may be embodied in a solid pulley or in a split or sectional pulley, but for convenience I will describe the same as embodied in a pulley of the latter type.

In the drawings Figure 1 is an elevation of one section or half of a pulley embodying my invention; Fig. 2 a sectional elevation on line A—B of Fig. 1; Figs. 3 and 4 detail views, illustrating a means for securing or anchoring the extreme outer ends of the spokes; Fig. 5 a detail of a modified form of such means; Fig. 6 a sectional plan on line C—D of Fig. 1; Figs. 7 and 8 detail views of modified forms of construction of the side plate and hub thimble; and Fig. 9 a perspective of the hub portion and inner end of the spokes of one of the pulley sections.

As herein shown, the rim 1 is infolded at its central portion to form a web 2 and its edges 3 are preferably rolled inwardly whereby the rim is materially strengthened. The spokes 4 are arranged in pairs, face to face, and by preference are provided with a longitudinal rib 5 to increase the strength thereof. The outer ends of these spokes are secured to the web 2 by rivets 6, and their inner ends are bent at substantially right angles to form a portion of the hub structure.

For the purpose of firmly securing or anchoring the outer ends of the spokes to the web 2 of the rim, a tongue 4ᵃ may be pressed or formed from the outer end of each spoke and inwardly directed toward each other through a slot 4ᵇ formed in the web. As illustrated in Figs. 3 and 4 the tongues 4ᵃ abut each other and being of equal length meet at the central line of the web. However, as illustrated in Fig. 5 the tongues 4ᶜ may be made the full width or thickness of the web and the tongues of corresponding spokes may be arranged side by side in a slot in the web of a sufficient length to receive both tongues 4ᶜ. This construction results in a material strengthening of the pulley and serves to relieve the rivets 6 of shearing strain caused by torsional and centrifugal forces.

Within the inner or hub ends of the spokes is arranged a hub thimble 8 forming the foundation or inner member of the hub, the central portion 9 of which thimble is circumferentially expanded so as to fill the space between the lower or inner ends of the spokes, thereby separating and strengthening the same. Two similar substantially semi-circular plates 10 are provided for each pulley section, the same being secured to the outer faces of the spokes by rivets or otherwise. Each plate 10 has an outwardly directed semi-circular flange 11, fitting upon the hub portion of the spokes, as clearly shown in Figs. 2 and 9. Each plate has a series of depressions 12, substantially V-shaped and corresponding in position and shape with the space between the spokes, whereby the spokes are effectually braced or supported at their inner ends and relieved of torsional strain. In the present instance the plates 10 are secured to the spokes by means of rivets 13, which also pass through the expanded central portion 9 of the hub thimble 8, as shown in Fig. 2, while the flange 11, hub portion 7 and thimble 8 are secured together by rivets 14, as shown in Fig. 1.

The depressions in the plates 10 may be made equal in depth to the thickness of the spokes and thereby extend to the expanded portion of the hub thimble as illustrated in Figs. 6 and 9, but such depression may extend only part way of the thickness of the spokes as shown at 10ᵃ in Fig. 7, and the sides 9ᵃ of the expanded portion of the hub thimble may be extended laterally, at intervals, thereby meeting the depressions of the plate 10 (Fig. 7), or, if desired, the plate may be made flat and the expanded portion of the hub thimble may be extended laterally, at intervals, the full thickness of the spokes, as shown by 9ᵇ in Fig. 8.

Any suitable clamping mechanism such as the sectional clamps 15 of the ordinary and well known construction may be employed for clamping the hub sections together.

I claim:

1. A pulley comprising a rim, a series of spokes connected therewith at their outer ends and outwardly bent at their inner ends to form a hub portion, a hub thimble arranged within the hub portion of the spokes and having a circumferentially expanded portion extending between the inner ends of the spokes and secured to such spokes, and means for clamping the hub portion of the spokes and hub thimble together; substantially as described.

2. A pulley comprising a rim, a series of spokes connected therewith at their outer ends and outwardly bent at their inner ends to form a hub portion, a hub thimble arranged within the hub portion of the spokes and having a circumferentially expanded portion extending between the inner ends of the spokes and secured to such spokes, plates or rings 10 also secured to the spokes, and means for clamping the hub portion of the spokes and hub thimble together; substantially as described.

3. A pulley comprising a rim, a series of spokes connected therewith at their outer ends and outwardly bent at their inner ends to form a hub portion, a hub thimble arranged within the hub portion of the spokes and having a circumferentially expanded portion extending between the inner ends of the spokes, plates or rings 10 arranged at the inner ends of the spokes, said expanded portion of the thimble and said plates having interlocking connection with said spokes, and means for clamping the hub portion of the spokes and hub thimble together; substantially as described.

4. A pulley comprising a rim, a series of spokes connected therewith at their outer ends and outwardly bent at their inner ends to form a hub portion, a hub thimble arranged within the hub portion of the spokes and having a circumferentially expanded portion extending between the inner ends of the spokes, plates or rings 10 arranged at the inner ends of the spokes, said expanded portion of the thimble and said plates having means for distancing the inner ends of the spokes both longitudinally of the axis of rotation and angularly thereof, and means for clamping the hub portion of the spokes and hub thimble together; substantially as described.

5. A pulley comprising a rim, a series of spokes connected therewith at their outer ends and outwardly bent at their inner ends to form a hub portion, a hub thimble arranged within the hub portion of the spokes and having a circumferentially expanded portion extending between the inner ends of the spokes, plates or rings 10 arranged at the inner ends of the spokes, and fastening means passing through the plates, spokes and expanded portion of the hub thimble for securing said parts together; substantially as described.

6. A pulley comprising a rim, a series of spokes connected therewith at their outer ends and outwardly bent to form a hub portion, plates 10 secured to the outer sides of the spokes and having depressions 12 positioned between the spokes and also having flanged portions 11 fitting upon and secured to the hub portion of the spoke, and clamps fitting upon said flanges 11; substantially as described.

7. A pulley comprising a rim, a series of spokes connected therewith at their outer ends and outwardly bent to form a hub portion, plates 10 secured to the outer sides of the spokes and having flanged portions 11 substantially semi-circular and fitting upon and secured to the hub portion of the spokes, a hub thimble, means for securing the hub portion, flanged portions 11 and the thimble together, and clamping plates having semi-circular portions fitting over and upon the flanged portion 11 of said plates; substantially as described.

8. A pulley comprising a rim, a series of spokes connected therewith at their outer ends and outwardly bent to form a hub portion, plates 10 secured to the spoke and having flanges 11 fitting upon and secured to the hub portion of the spokes, a hub thimble having a central expanded portion arranged between corresponding spokes, means for securing the hub portion, flanges 11 and thimble together, and clamps fitting over the flanges 11; substantially as described.

9. A pulley comprising a rim, a series of spokes connected therewith at their outer ends and outwardly bent to form a hub portion, plates 10 secured to the spokes and having flanges 11 fitting upon and secured to the hub portion of the spokes, a hub thimble having a central expanded portion arranged between corresponding spokes, rivets 13 passing through plates 10, the hub portion of the spokes and said expanded portion of the thimble, and clamps fitting over the flanges 11; substantially as described.

10. A pulley comprising a rim, a series of spokes connected therewith at their outer ends and outwardly bent to form a hub portion, plates 10 secured to the outer sides of the spokes and having substantially right-angled semi-circular flanges 11 fitting upon and secured to the hub portion of the spokes, sectional clamps, each section thereof comprising a semi-circular plate fitting over a flange 11, a hub thimble arranged within the hub portion of the spokes, and rivets 13 securing the thimble to the spokes; substantially as described.

11. A pulley comprising a rim provided with an inwardly directed web having a series of transverse openings, a hub, and spokes arranged in opposing pairs, the inner ends of the spokes being connected with the hub and the outer ends thereof being flanged to engage said openings, the members of each pair entering said openings from opposite sides of the web; substantially as described.

12. A pulley comprising a rim having a portion thereof infolded to form a web, said web being provided with a series of transverse openings at points coincident with the points of attachment of the spokes, a hub, and spokes connected at their inner ends with the hub and having their other ends flanged to engage said openings in the web, said spokes being arranged in pairs with the members thereof opposed and having their outer flanged ends entering said openings from opposite sides of the web; substantially as described.

13. A pulley comprising a rim, a hub thimble, a series of spokes connected at their outer ends with the rim and connecting at their inner ends with the thimble, and plates 10 having substantially radial portions secured to the outer sides of the spokes and each having an outwardly directed portion fitting upon the inner ends of the spokes, said radial portion being provided with depressions fitting between the inner ends of the spokes and fastening means passing through the plates 10 and the spokes for fastening them together; substantially as described.

14. A pulley comprising a rim, a hub thimble, a series of spokes, connected at their outer ends with the rim and connected at their inner ends with the thimble, and plates 10 having depressions fitting between the inner ends of the spokes, each of said plates being provided with a substantially radial portion secured to the outer sides of the spokes, and with a lateral portion or flange 11 which is substantially semi-circular and parallel with the axis of rotation, said flange constituting a part of the hub structure; substantially as described.

15. A pulley comprising a rim, a series of spokes connected therewith at their outer ends and outwardly bent at their inner ends to form a hub portion, a hub thimble arranged within the hub portion of the spokes and having a hollow portion which is circumferentially expanded from the body of such thimble, such expanded portion extending between the inner ends of the spokes, rivets passing through opposite spokes and through such expanded portion for securing such parts together, and means for clamping the hub portion of the spokes and hub thimble together; substantially as described.

16. A pulley comprising a rim, a series of spokes connected therewith at their outer ends, a hub thimble coöperating with the inner ends of said spokes and two pairs of separate plates 10 secured respectively to the outer sides of the spokes and having depressions fitting between the inner ends of adjacent spokes and interlocking with them, each of said plates 10 having a lateral extension or flange which is semi-circular in form and fits over the hub thimble, and rivets passing through the plates 10 and the spokes for securing them together; substantially as described.

17. A pulley comprising a rim, a series of spokes connected therewith at their outer ends, a hub thimble coöperating with the inner ends of such spokes and having a circumferentially expanded portion extending between the inner ends of the spokes, and pairs of plates 10 secured to the inner ends of the spokes and having V-shaped depressions fitting between and interlocking with the inner ends of the spokes; substantially as described.

HENRY J. GILBERT.

Witnesses:
S. E. HIBBEN,
LOUIS B. ERWIN.

Copies of this patent may be obtained for five cents each, by addressing the "Commissioner of Patents, Washington, D. C."